United States Patent [19]
Bothe, II

[11] Patent Number: 4,723,064
[45] Date of Patent: Feb. 2, 1988

[54] PURGE GAS SYSTEM FOR WELDING PIPES

[76] Inventor: Bill A. Bothe, II, 2041 San Vincente Dr., Concord, Calif. 94519

[21] Appl. No.: 902,933

[22] Filed: Aug. 2, 1986

[51] Int. Cl.⁴ .............................................. B23K 26/12
[52] U.S. Cl. ............................... 219/121 FS; 219/160
[58] Field of Search ............. 219/121 FS, 60 R, 60 A, 219/160

[56] References Cited

U.S. PATENT DOCUMENTS 2,433,296  12/1947  Schaefer ...................... 219/160 X
4,454,405  6/1984  Riley .................................. 219/60 R Primary Examiner—C. L. Albritton
Attorney, Agent, or Firm—Schapp and Hatch

[57] ABSTRACT

A purge gas system for welding pipes having a flat circular plate with a flat gasket adapted to engage the end of a pipe section and a pair of toggle joints positioned inside the end of the pipe and formed to have their knuckles press outwardly against the interior surface of the pipe upon rotation of a thumbscrew threadably engaged on a tube passing through the center of the plate, the tube being hollow for supplying purge gas and for permitting removal of ambient atmosphere displaced by the purge gas.

8 Claims, 8 Drawing Figures

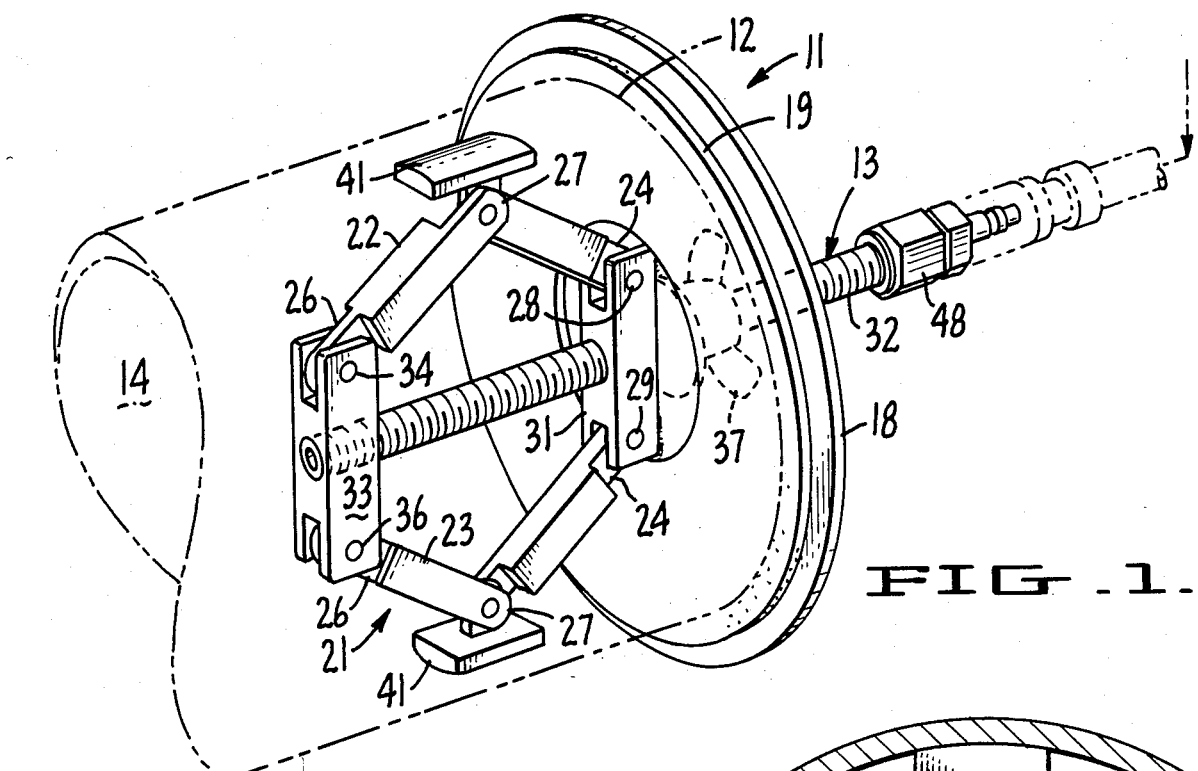
FIG. 1.
FIG. 3
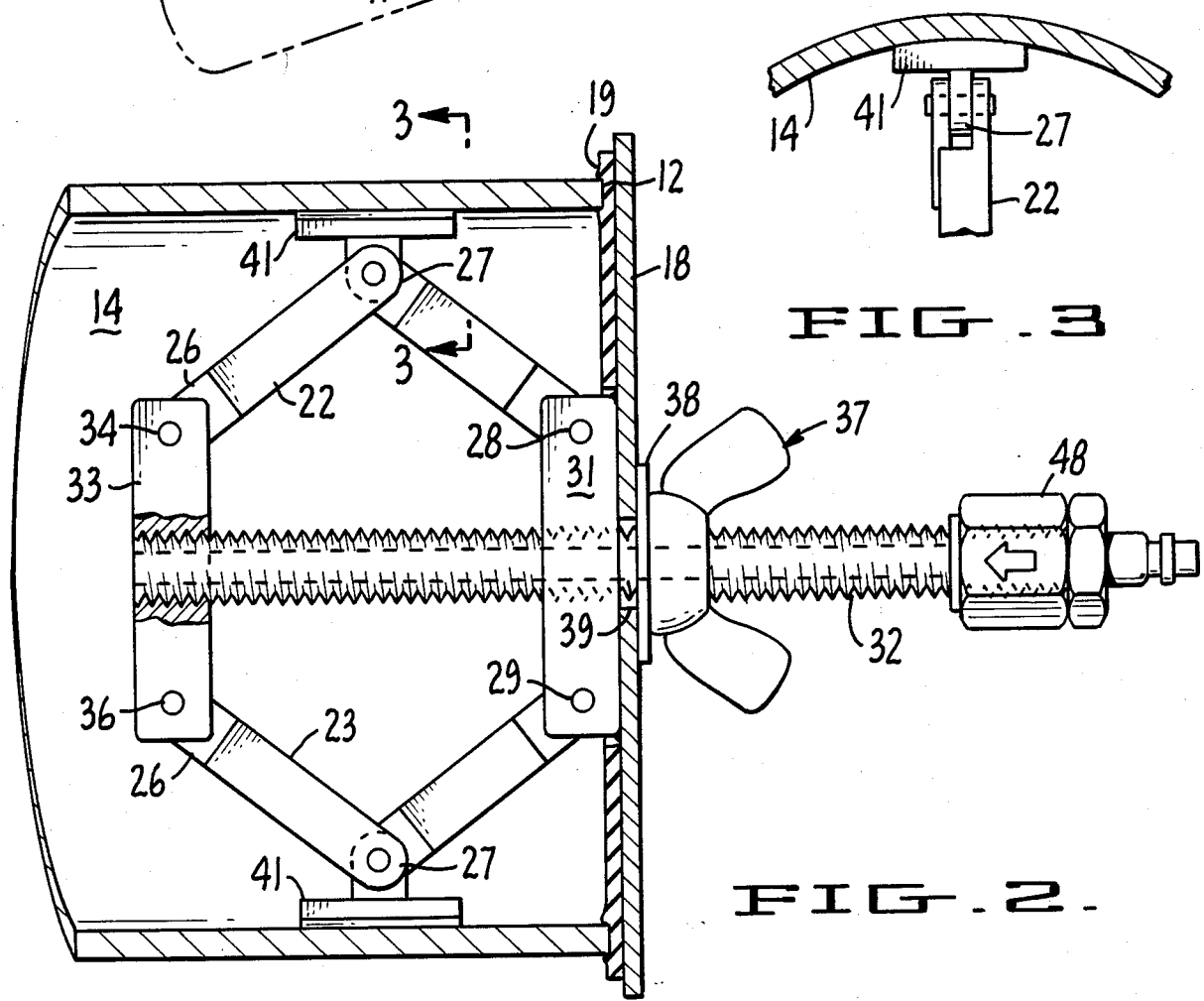
FIG. 2.

PURGE GAS SYSTEM FOR WELDING PIPES

BACKGROUND OF THE INVENTION

1. Field of the Invention

This invention relates to the welding of pipes under conditions which require exclusion of the atmosphere from the interior of the pipe, and more particularly to a system of this character which can be used on pipes of differing sizes.

2. Description of the Prior Art

The term "prior art" as used herein, or in any statement by or on behalf of applicant means only that any document or thing referred to as prior art bears, directly or inferentially, a date which is earlier than the effective filing date hereof.

When welding pipes together under conditions requiring exclusion of the atmosphere, the weld site and the interior of the pipes are flushed with an inert gas such as argon and/or nitrogen. These gases are commonly referred to as "purge" gases vicinity of the weld. For example, when making a TIG or Tungsten Inert Gas weld, the welding torch has a concentric sleeve surrounding the electrode through which argon under pressure is supplied to the weld site. This flow of argon excludes the atmosphere from the weld arc. In order to exclude atmosphere from the side of the weld site opposite to the torch, purge gas under pressure, such as argon, is used to drive the oxygen-bearing atmosphere from the interior of the pipes being welded and to maintain an oxygen-free condition at the weld site.

When using purge gases, welders commonly blank off open pipe ends with sheet materials at hand such as wood, metal and even cardboard. Typically, the sheet material is not held firmly in place and often blows off the open pipe end because of the pressure of purge gas within the pipe.

Various devices have been proposed for closing off open pipe ends for a variety of purposes other than purge gas welding. For instance, U.S. Pat. No. 2,810,401 to Burton J. Stansbury shows a pipe end closure used to keep children and animals from crawling into the open pipe end when it is left unguarded overnight. The Stansbury device has a toggle system internally of the pipe which moves outwardly as a key outside the closure is rotated to turn a threaded shaft on which a follower connected to the toggle arms moves. The Stansbury device is not gas-tight and the closure member, which is in the form of a shallow cup, can be used only with one size of pipe.

Other pipe closures utilize expandable members of resilient material (such as U.S. Pat. Nos. 3,550,636 and 3,577,737). These do not close off the pipe at its open end, but rather a spaced distance internally therefrom and require relatively enormous expanding pressure to remain in place by friction alone against pressure of fluids trying to escape from the pipe through the open end.

U.S. Pat. No. 2,256,775 to Alfred W. Hubbell shows a pipeline plug insertable in a pipeline "to effeotively seal the line against flow from downstream side thereof while repairs are being made." This device is urged through the line by the application of fluid pressure upon its upstream side.

U.S. Pat. No. 4,316,487 shows a "tubular obturator" for closing a pipeline when it is desired to subject the pipeline to a pressure test. This device expands internally of the pipe to hold the device in place by friction.

U.S. Pat. No. 4,285,368 to Garrett D. Terrill, et al. shows a specialized closure insertable in a special fitting having a general tubular portion extending transverse to the axis of the pipeline.

U.S. Pat. No. 4,494,584 shows an internal radially-expandable plug for sealing one section of a pipe from another to prevent different fluids in the different sections from mixing.

It is believed that the patents discussed above contain information which is or might be considered to be material to the examination of this application. These patents are believed to be relevant to the present invention because they were adduced by a prior art search made by an independent searcher. A copy of each of the above-listed patents is supplied to the Patent and Trademark Office herewith.

No representation or admission is made that any of the above-listed documents is part of the prior art, in any acceptation of that term, or that no more pertinent information exists.

SUMMARY OF THE INVENTION

The purge gas system for welding pipes of the present invention greatly improves and facilitates the welding of pipes in an inert, oxygen-free environment. The system provides devices for sealing off the open ends of the pipes being welded, and maintaining purge gas within the pipe, in an effective and simple manner not hitherto obtainable. The pipe end sealing devices provide a positive grip on the interior of the pipe, thus leaving the exterior unimpeded for welding operations.

The pipe end sealing devices are formed to fit into and be effective with pipes having different diameters, so that single end-sealing device may be used with two or more different sizes of pipe.

The end-sealing devices are held rigidly in place simply by tighting a thumbscrew, and are as simply released from the pipe ends by back off the thumbscrew. The thumbscrew is threadably mounted on a pipe which extends axially through the ceiling device to the interior of the sealed off pipe and this further facilitates the welding operation by making it easier to introduce the purge gas to the interior of the pipe and to remove ambient atmosphere from the pipe by reason of the flow of purged gas therethrough.

It is therefore an object of the present invention to provide a purge gas system for welding pipes in which the open ends of the pipe sections to be welded together are hermetically sealed to confine the purge gas to the interior of the pipe sections and prevent entry of non-inert atmosphere.

Another object of the present invention is to provide the purge gas system for welding pipes of the character described in which the devices for sealing the ends of the pipe sections are readily installed and locked into place without the use of additional tools.

A further object of the present invention is to provide a purge gas system for welding pipes of the character set forth in which the devices for sealing the open ends of the pipe sections to be welded are capable of fitting pipes of different diameters.

A still further object of the present invention is to provide a purge gas system for welding pipes of the character described which is simple and sturdy in construction and use, and which may be re-used many times.

Other objects and features of advantage will become apparent as the specification progresses and from the claims.

BRIEF DESCRIPTION OF THE DRAWINGS

FIG. 1 is a perspective view of a device for sealing off pipe ends mounted in operative position in the end of a pipe, with the pipe being shown in section and portions of the gas connections to the device being shown in dotted lines.

FIG. 2 is a vertical longitudinal sectional view on an enlarged scale of the apparatus of FIG. 1.

FIG. 3 is a fragmentary vertical cross-sectional view on a further enlarged scale taken substantially on the plane of line 3—3 of FIG. 2.

Figure 4:
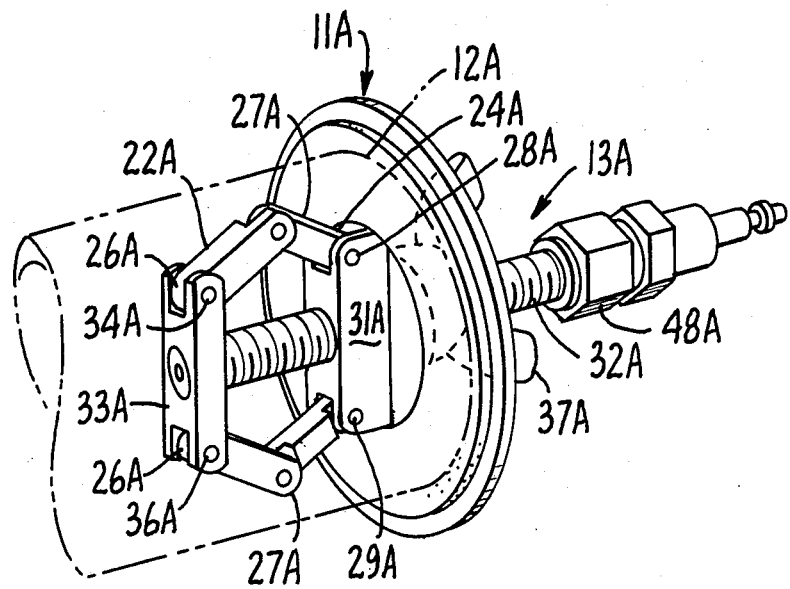
FIG. 4 is a view similar to that of FIG. 1 but showing the apparatus modified for use in pipes of smaller diameter.

While only the preferred forms of the invention are illustrated in the drawings, it will be apparent that various modifications could be made without departing from the ambit of the claims.

DESCRIPTION OF THE PREFERRED EMBODIMENTS

As may be seen in the accompanying drawings, the purge system for welding pipes of the present invention provides sealing means 11 adapted for removable mounting on a pipe end 12 and formed for selectively closing off fluid flow through the pipe end, flow means 13 passing through the sealing means 11 and formed for selectively delivering purge gas under pressure through the sealing means 11 to the interior 14 of the pipe, together with control means 16 connected to the flow means 13 and adapted for selectively communicating the interior of the pipe to a source 17 of fluid under pressure and to the atmosphere.

In accordance with the invention, the sealing means 11 is in the form of a plate 18 sized to fit across the open end 12 of the pipe. Gasket means 19 of resilient material such as natural or synthetic rubber is mounted on the plate 18 and is formed to provide a hermetic seal between the plate 18 and the end 12 of the pipe. Mounting means 21 is carried by the plate 18 and is positionable interiorly of the pipe 14 and, at the same time, is operable from the outside the pipe for urging the plate 18 and gasket means 19 against the confronting end 12 of the pipe.

The mounting means 21 has a pair of toggles 22 and 23. Each of the toggles has first and second ends 24 and 26 and intermediate knuckles 27. The ends 24 of the toggles 22 and 23 are pivotally secured at 28 and 29 to a mounting member 31 affixed to the plate 18.

As a feature of the present invention, the flow means 13 is provided in the form of an elongated tubular member 32 mounted for axial movement through the plate 18. A block 33 is journaled on the inner end of the tubular member 32 within the pipe interior 14, and the ends 26 of toggles 22 and 23 are pivoted to block 33 at 34 and 36. The toggles 22 and 23 are formed for moving their knuckles 27 outwardly toward the interior of the pipe upon movement of the block 33 toward the plate 18.

Screw means, here in the form of a large thumbscrew 37, is threadably engaged on the tubular member 32 for relative rotation and bears against plate 18 through washer 38. Rotation of the thumbscrew 37 on the tubular member 32 draws the tubular member through the central opening 39 in plate 18 so as to urge the block member 33 toward the plate and, by reason of the geometry of the toggles 22 and 23 urge the knuckles 27 outwardly against the interior of the pipe.

In the form of the invention illustrated in FIGS. 1 through 3 of the drawings, the toggles 27 are pivotally attached to curved feet 41. The outer faces of the members 41 are curved to be complementary to the curvature of the interior 14 of the pipe, and this improves the grip of the feet 41 on the pipe when the apparatus is locked in place to seal off the pipe end.

Figure 5:
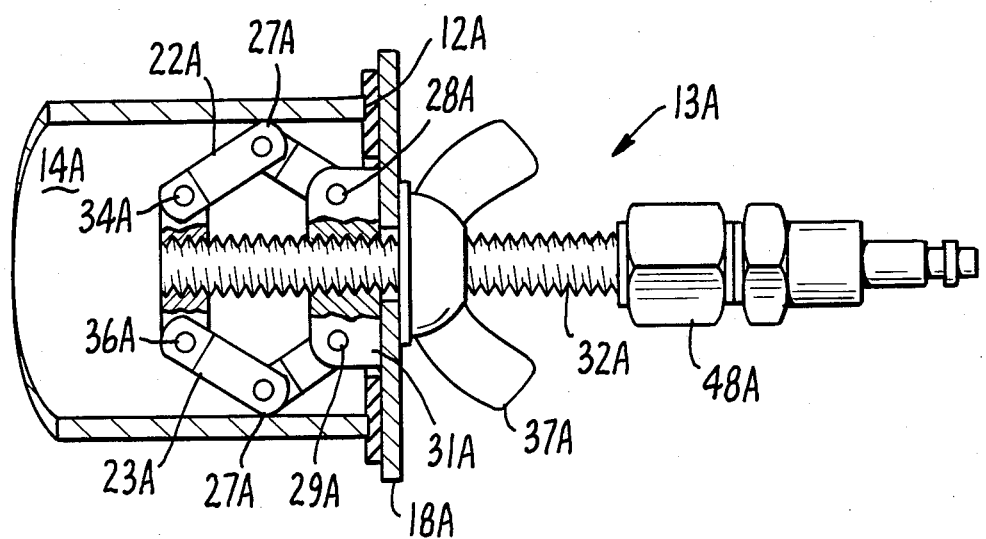
FIG. 5 is a vertical cross-sectional view through the apparatus of FIG. 4 and its associated pipe end.

In the form of the invention illustrated in FIGS. 4 and 5 of the drawings, like parts are given like numbers followed by the letter "A". This form of the invention is particularly suited for use with pipes of smaller diameter, being close coupled and eliminating the pipe engaging feet to conserve space.

Figure 6:
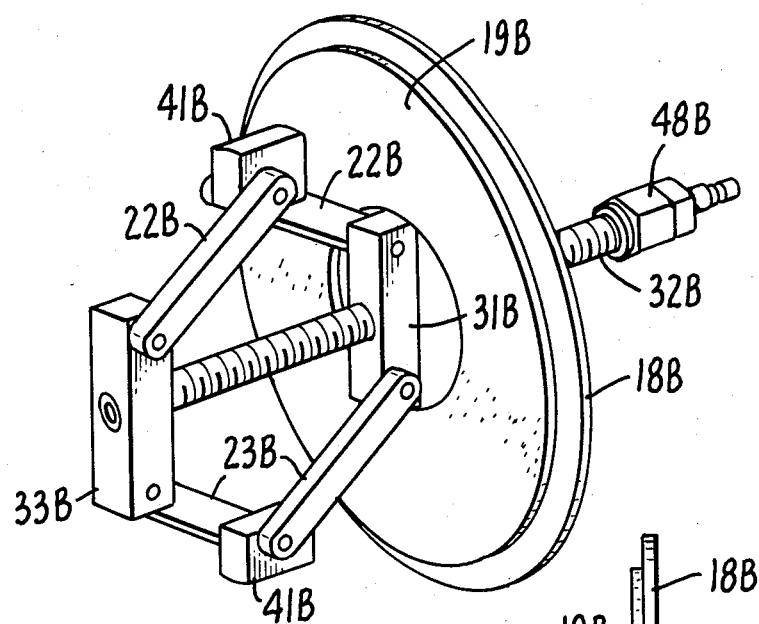
FIG. 6 is a perspective view similar to that of FIG. 1 but showing a further modified form of the invention requiring less machining.
Figure 7:
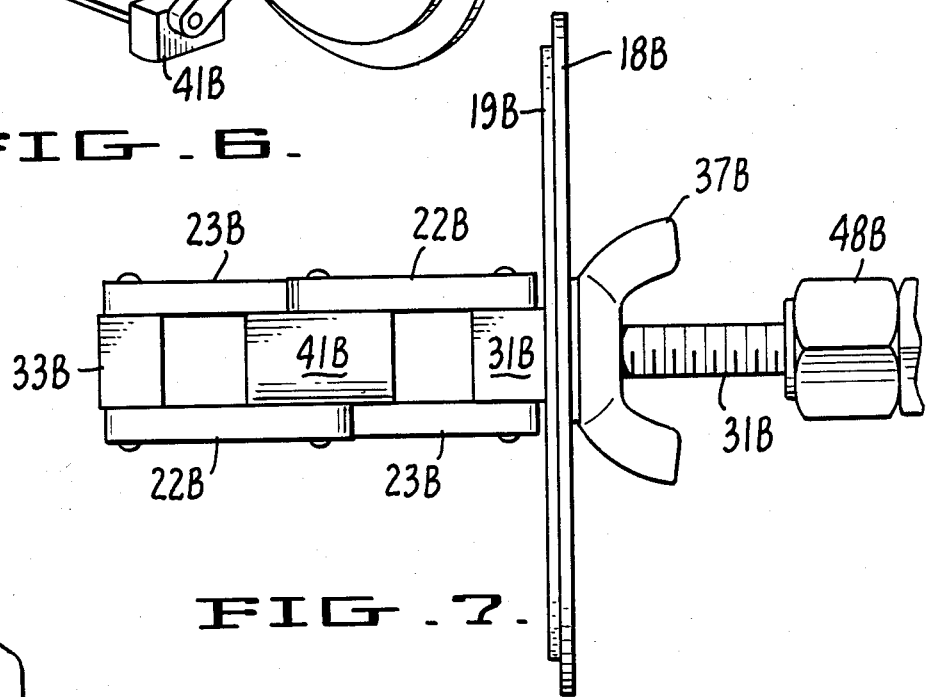
FIG. 7 is a plan view on an enlarged scale of the apparatus of FIG. 6.

The form of the invention illustrated in FIGS. 6 and 7 of the drawings, parts similar to those of FIG. 1 are given the same numbers, adding the letter "B". The device of FIG. 6 is considerably simplified over the device of FIG. 1 and thus eliminates considerable machining. I have found that the toggles 22B and 23B can be made in the manner shown in FIGS. 6 and 7, with the toggle links pivoted to opposite sides of the mounting block 31B, and to opposite sides of the member 33B. This spaces the toggle links apart and a pair of blocks 41B pivoted between the toggle links provide the pipe engaging feet. Although the forces in each of the toggles are not balanced, the two toggles taken as a pair do provide balanced forces.

Figure 8:
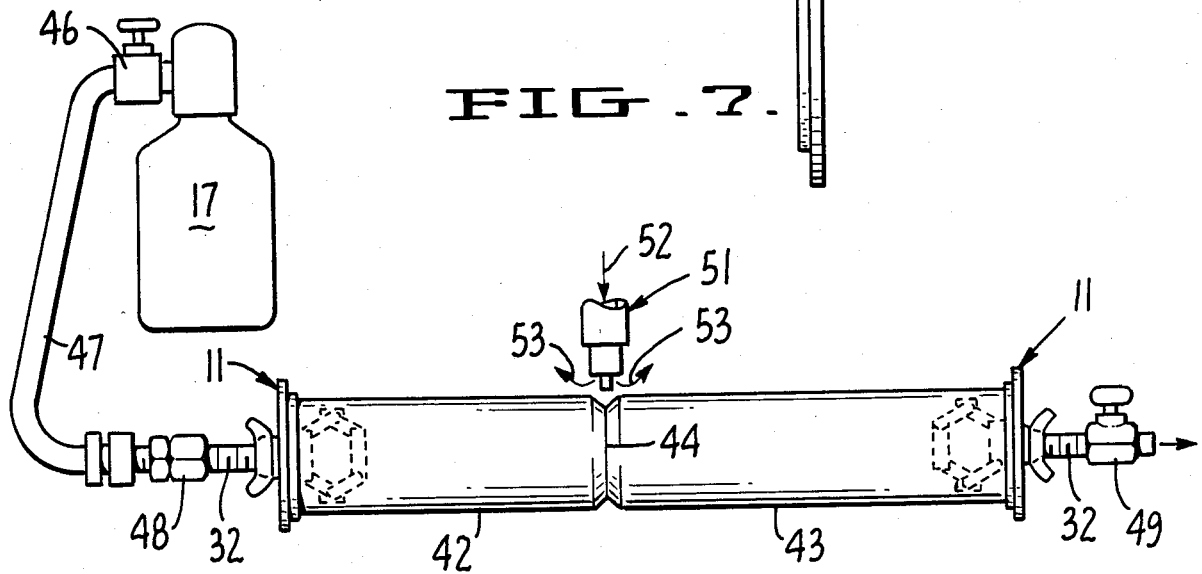
FIG. 8 is a schematic view of two sections of pipe being welded together while being supplied with purge gas by the system of the present invention.

The mode of use of the system of the present invention is illustrated in FIG. 8 of the drawings wherein two sections of pipe 42 and 43 are to be welded together at 44 where their inner ends abut. The outer ends of the pipe sections 42 and 43 are each provided with one of the present sealing means 11. Purge gas is fed from cylinder 17 under control of valve 46 through hose 47 and check valve 48 to the conduit 32 and thence to the interior of the pipe sections 42 and 43.

As the inert purge gas is fed into pipe section 42 (left to right as viewed in FIG. 8) it displaces the ambient atmosphere out of the pipe sections through conduit 32. A manually controllable valve 49 is interposed in conduit 32 for restricting flow from the pipe sections and hence raising the internal backpressure to the desired value.

A typical welding torch 51 is shown in FIG. 8 in position to effect the weld at 44. Inert gas fed into torch 51, as indicated by arrows 52, displaces ambient atmosphere away from the location in which the weld is taking place as indicated by the arrows 53.

From the foregoing, it will be apparent that the purge gas system for welding pipes of the present invention offers significant advances in the inert gas welding of pipes, and is particularly advantageous over the previously used flimsy devices prone to be blown off the end of the pipe by the pressure of the purge gas.

What is claimed is:

1. A purge gas system for welding pipes, comprising
sealing means adapted for removable mounting on a pipe end and formed for selectively closing off fluid flow through said pipe end,
flow means passing through said sealing means and formed for selectively delivering purge gas under pressure through said sealing means to the interior of said pipe and removing fluid from the interior of said pipe,
and control means connected to said flow means and adapted for selectively communicating said interior of said pipe to a source of fluid under pressure and to the atmosphere,
said sealing means comprising
a plate sized to fit across the open end of the pipe,
gasket means of resilient material mounted on said plate and formed to provide a heremetic seal between said plate and said end of the pipe,
and mounting means on said positionable interiorly of said pipe and operable from outside said pipe for urging said plate against the confronting end of said pipe.

2. A purge gas system for welding pipes, comprising
sealing means adapted for removable mounting on a pipe end and formed for selectively closing off fluid flow through said pipe end,
flow means passing through said sealing means and formed for selectively delivering purge gas under pressure through said sealing means to the interior of said pipe and removing fluid from the interior of said pipe,
and control means connected to said flow means and adapted for selectively communicating said interior of said pipe to a source of fluid under pressure and to the atmosphere,
said flow means and control means comprising conduit means adapted for connection to a source of purging gas under pressure,
valve means in said conduit formed for regulating rate of flow of said purge gas into said pipe end,
and check valve means in said conduit formed for preventing back flow from the interior of said pipe through said conduit means.

3. A purge gas system for welding pipes as described in claim 1, and wherein said mounting means comprises a pair of toggles having first and second ends and intermediate knuckles,
a pivotal connection between said first ends of said toggles and said plate,
an elongated tubular member mounted for axial movement through said plate,
a block secured to said tubular member and positionable within said pipe,
a pivotal connection between said second ends of said toggles and said block,
said toggles being formed for moving said knuckles outwardly toward the interior of said pipe upon movement of said block toward said plate,
and screw means threadably engaged on said tubular member for relative rotation and formed for bearing against said plate whereby rotation of said screw means on said tubular member draws said tubular member through said plate so as to urge said block toward said plate and urge said knuckles outwardly against the interior of said pipe.

4. A purge gas system for welding pipes as described in claim 3, and wherein said knuckles of said toggle joints are provided with bar members parallel to the axis of said elongated member formed for frictional engagement with the interior of the pipe over defined areas.

5. A purge gas system for welding pipes as described in claim 4, and wherein said bar members have the sides thereof contactable with the interior of said pipe curved complementarily to the curvature of the interior of said pipe.

6. A purge gas system for welding pipes as described in claim 2, and wherein said sealing means further comprises
a second sealing means formed for removable mounting on the other end of said pipe for closing off fluid flow therethrough,
said second sealing means having a restricted opening therethrough for emission of purged fluid from the interior of the pipe.

7. A purge gas system for welding pipes as described in claim 6, and wherein valve means is connected to said restricted opening for selectively controlling and shutting off flow of said purged gas from the interior of said pipe.

8. A purge gas system for welding pipes as described in claim 7, and wherein said pipe is in a plurality of abutting sections to be welded together by an inert gas welder.

* * * * *